United States Patent [19]

Dekker

[11] Patent Number: 4,474,546
[45] Date of Patent: Oct. 2, 1984

[54] BOX-LIKE PALLET, ESPECIALLY FOR MATURING CHEESE

[75] Inventor: Albert Dekker, Koekange, Netherlands

[73] Assignee: Brink Luchtverwarming B.V., Netherlands

[21] Appl. No.: 469,381

[22] Filed: Feb. 24, 1983

[30] Foreign Application Priority Data

Mar. 8, 1982 [NL] Netherlands ............... 8200949

[51] Int. Cl.³ .................. B29C 1/00; B29C 15/00
[52] U.S. Cl. ........................ 425/394; 249/117; 249/160; 249/167; 249/170
[58] Field of Search ........... 249/170, 117, 161, 155, 249/167, 171, 160; 425/394; 217/13, 15, 43 A, 43 R, 47, 65

[56] References Cited

U.S. PATENT DOCUMENTS

| Re. 23,489 | 4/1952 | Toone | 99/116 |
| 906,472 | 12/1908 | Treischman | 217/15 |
| 1,245,046 | 10/1917 | Scott | 249/161 |
| 2,103,545 | 12/1937 | Miollis | 31/46 |
| 3,337,720 | 8/1967 | Sinclair | 217/15 |
| 3,729,111 | 4/1973 | Farnsworth | 217/43 R |
| 3,797,980 | 3/1974 | Budahn | 425/84 |
| 3,918,877 | 11/1975 | Pickett | 249/161 |

FOREIGN PATENT DOCUMENTS

| 2237851 | 2/1974 | Fed. Rep. of Germany | 217/47 |
| 916723 | 12/1946 | France | |
| 1151162 | 1/1958 | France | |
| 2304283 | 10/1976 | France | |
| 324941 | 10/1957 | Switzerland | 217/43 |
| 16945 | of 1891 | United Kingdom | 217/15 |
| 205149 | 10/1923 | United Kingdom | 217/43 |
| 937441 | 9/1963 | United Kingdom | |

OTHER PUBLICATIONS

Copy of European Search Report Re. Appln. EP 83 20 0318.

Primary Examiner—Willard E. Hoag
Attorney, Agent, or Firm—Steele, Gould & Fried

[57] ABSTRACT

A box-like pallet provided with a bottom and two or more interconnected, upright side walls. The two side edges of at least one side wall are connected to the adjacent side walls, in an upwardly and downwardly movable manner relative to the bottom, by means of at least two strips which are pivotably mounted on the side walls.

6 Claims, 14 Drawing Figures

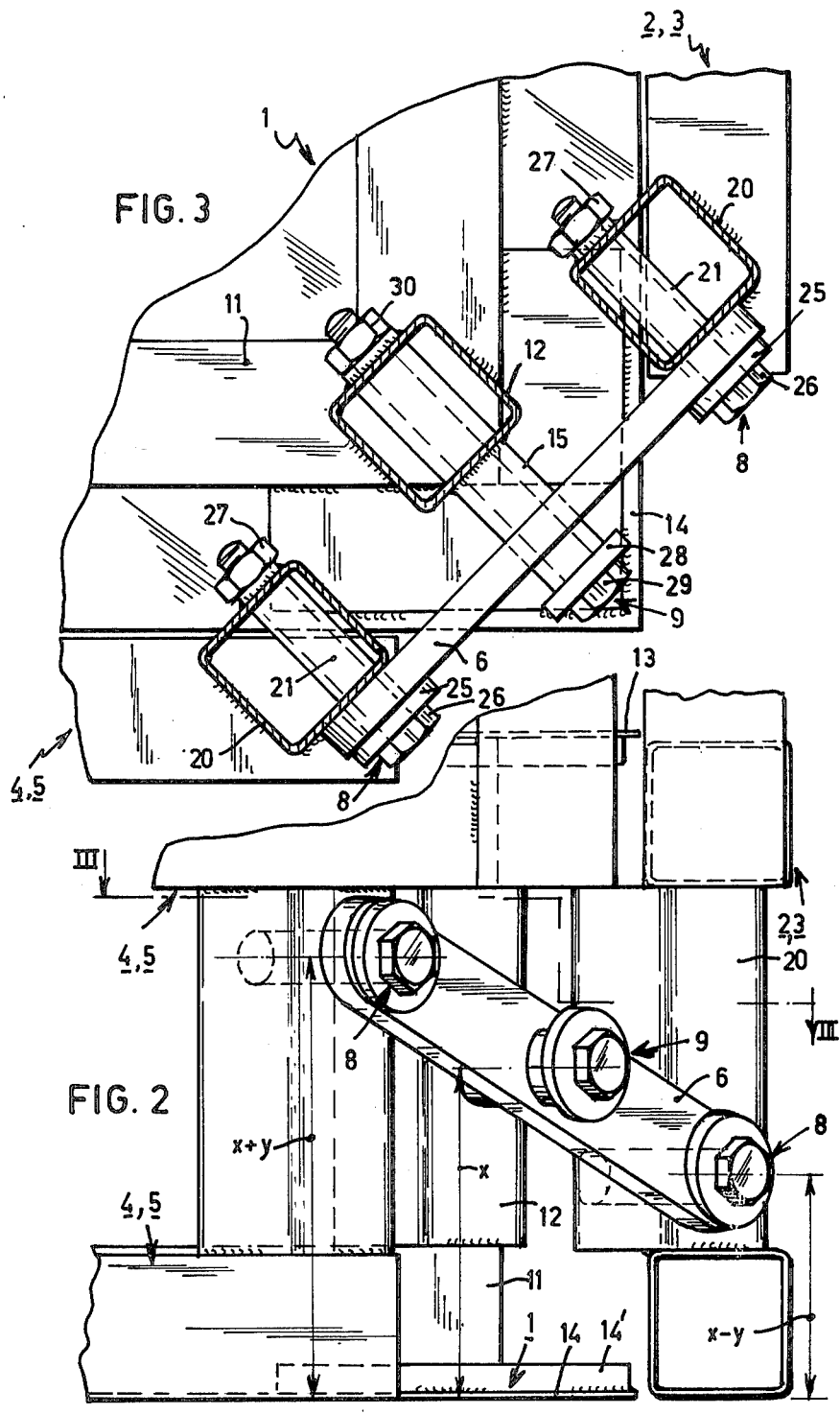

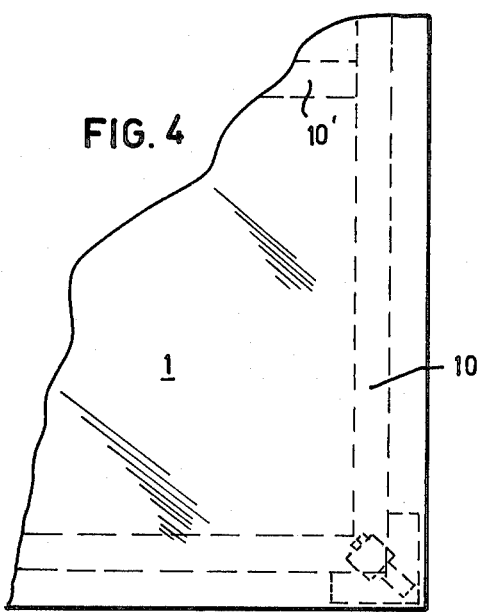
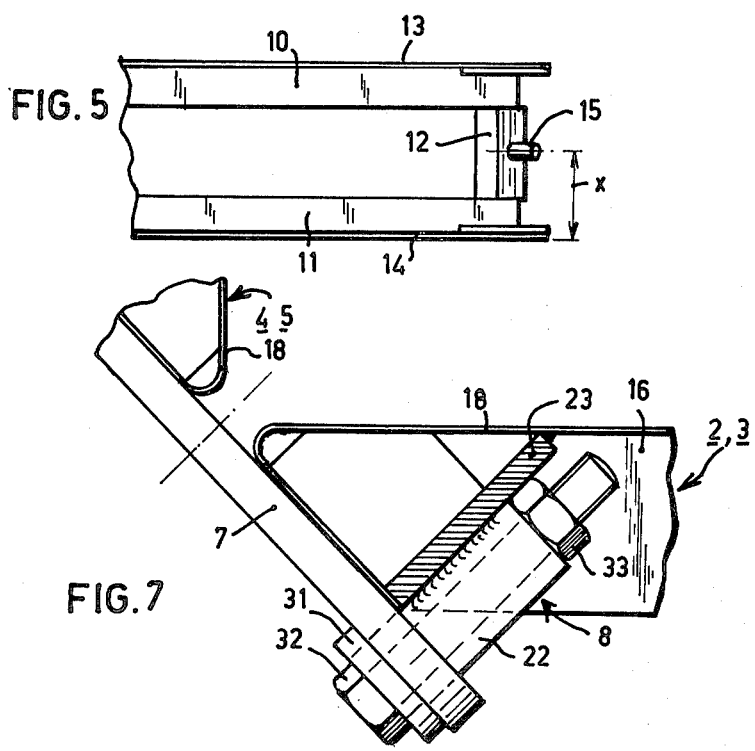

BOX-LIKE PALLET, ESPECIALLY FOR MATURING CHEESE

During the maturing process of cheese the latter tends to sag and deform laterally as a consequence of the soft structure and gravity, which is a particular disadvantage with cheddar cheese with a square or rectangular cross-section, as thereby the appearance of the cheeses becomes unattractive and the major advantage of rectangular cheeses, being little waste material and easy handling, is lost.

In British Patent Specification No. 937 441 is suggested to abolish the above-mentioned disadvantage by packing the cheeses to be matured in rectangular cardboard boxes, the inner sizes of which correspond to the outer sizes of the cheeses and by covering each side of the boxes with a board and by tightening steel tape straps, in two perpendicular directions about the boards, so that the cheeses in the boxes are loaded under pressure at all sides, so that sagging and deformation are prevented. A considerable disadvantage of said known method is, however, that the application and, after the cheese has matured, the removal of the steel straps and boards, as well as collecting, storing and dispatching same, is very labour-demanding.

In accordance with the invention a box-like pallet is used for the maturing process of the above-described cheeses, said pallet being well-known in its embodiment with a rectangular bottom and four upright side-walls, fixedly connected to the bottom and to each other.

The invention may, however, also be used with products with another configuration than the rectangular one, either or not packed in boxes which have to be enclosed at all sides, and should subsequently be untightened, for instance for glued articles, or shutterings.

The invention relates to a box-like pallet, provided with a bottom and two or more interconnected upright side walls.

In accordance with the invention the two side edges of at least one side wall are connected to the adjacent side walls, in an upwardly and downwardly movable manner relative to the bottom, by means of at least two strips which are pivotally mounted on the side walls, and that at least one other side wall is fixedly connected to the bottom.

In accordance with the invention the bottom of the box-like pallet may be round, or elliptical, generally such that the side walls are outwardly curved in a convex manner.

On such a, for instance, round bottom with the partially circular side walls round articles may be loaded under pressure at all sides in the horizontal plane, especially round cheeses, either or not packed, having a diameter which is somewhat larger than that of the bottom. This is realized by supporting the pallet with the bottom on a sheet-like elevation or support on the floor, which has such a thickness that when the lower edge of the movable side wall rests next to the sheet-like support on the floor, the pivot strips are parallel to the sheet-like support and the floor respectively. By selecting the sizes and the configuration of the bottom and/or of the articles such, that the articles at the side of the movable side wall protrude laterally beyond the bottom over a small distance, the articles can be loaded under pressure at all sides by means of the movable side wall, by lifting and removing the filled pallet from the sheet-like support by means of a fork truck and by lowering the pallet on the floor next to the sheet-like support, so that the movable side wall is forced upwardly by the weight on the pallet and is simultaneously moved inwardly by means of the pivot strips, so that this movable side wall presses against the articles. The articles may also be loaded under pressure from above by selecting the height of the side walls such that the upper articles protrude at a small distance above the side walls and by placing a filled pallet on top of the first pallet, the bottom of the superposed pallet vertically loading under pressure the articles in the lower pallet. The articles in the uppermost pallet of a stack of pallets can be loaded under pressure vertically by means of a sheet and weights, placed thereon.

The invention is based on the understanding that the movable side wall(s) of the pallet are adapted to be displaced outwardly and inwardly, parallelly to itself, and relative to the bottom of the pallet, by means of the weight of the articles, resting on the bottom.

When using for instance a pallet with a triangular bottom and three upright side walls, one of said walls being formed in the manner as suggested in the invention, it is possible for instance to load under pressure cheeses or similar articles, packed in triangular boxes, in three directions in the horizontal plane.

This is done in a similar way as in the above described embodiment. In this embodiment with a triangular bottom the sizes and configuration of the bottom and/or of the articles are selected such, that the articles in the layers abut each other at all sides and that the layers at the side of the movable side wall protrude laterally beyond the other side walls over a small distance. The layers of articles can be loaded under pressure in vertical direction from above in the same manner as with the above described embodiment.

The invention also relates to a box-like pallet, provided with a rectangular bottom and four upright, interconnected side walls. In accordance with the invention the two side edges of a pair of opposed side walls are connected to the adjacent side walls, in an upwardly and downwardly movable manner relative to the bottom, by means of at least two strips which are pivotally mounted on the side walls, and the other pair of opposite side walls is fixedly connected to the bottom.

In this embodiment the side walls, fixedly connected to the bottom, are placed at a distance from each other, said distance being less than the width of the layer of boxes or other products and articles in freely condition, so that when filling the pallet between the two fixed side walls they are already loaded under pressure in said direction. The two other opposed side walls are forced onto the layer of boxes or other products and articles in the same manner as in the above described embodiment, whereas the force, perpendicular to the layers of boxes or other products and articles, is also exerted in the same manner as with the above described embodiment.

In a very efficient embodiment of a box-like pallet, provided with a rectangular bottom and with four side walls, both interconnected and connected to the bottom, in accordance with the invention the two side edges of all side walls are interconnected, in an upwardly and downwardly movable manner relative to the bottom, by means of at least two strips which are pivotally mounted on the side walls and at each corner of the pallet the lower strip between the pivots on the side walls is mounted on a pivot pin, secured to the bottom, in such way that when the lower edges of the side walls and the lower surface of the bottom lie in one plane, and in each corner of the pellet the pivot pin is at a distance x from that plane, the pivot center line of the latter strip at the one side wall is at a distance x+y from said plane and the pivot center line of said strip at the other side wall is at a distance x−y from said plane, and the longitudinal center line of the pivot strips encloses an acute angle with the bottom of the pallet.

When in this embodiment of the pallet the bottom is supported above for instance the floor by a sheet-like support, having a thickness which is such that when the one pair of opposed side walls are forced onto the floor, the pivot strips arrive in a position parallel to the sheet-like support and the bottom respectively, then the distance between the side walls of each pair has reached its maximum value. Said distances correspond with the length and the width respectively, of a layer of boxes or other articles and products in the pallet, which abut each other at all sides. When the pallet is filled, it is removed from the sheet-like support, and placed on the floor, and the bottom is forced onto the floor by the weight of the boxes, and because of the pivot strips the other pair of side walls is also forced with the lower edge onto the floor and the side walls are drawn inwardly by means of the pivot strips, so that the boxes are loaded under pressure in two directions in the horizontal plane. The pressure in vertical direction is achieved in the same manner as with the above described embodiments.

By using the pallet of the invention it is possible to obtain great savings on the labour to be performed, as only two persons are necessary to handle the pallet, one to handle the pallet with the fork truck and one to fill and empty the pallets, and said operations may possibly also be performed by one person only.

Another advantage of the pallet of the invention is that a more gradual cooling of the product, particularly cheese, can be obtained, which involves a better quality of the cheese, a more regular product and a better structure of the cheese.

The pallets of the invention can be emptied by means of the fork truck as well, when the latter is provided with a tilting device, so that the pallets can be lifted and subsequently tilted over an angle of 180 degrees, and can thus be emptied.

The invention will be further elucidated on the basis of the drawings with a preferred embodiment of the box-like pallet of the invention.

Figure 1:
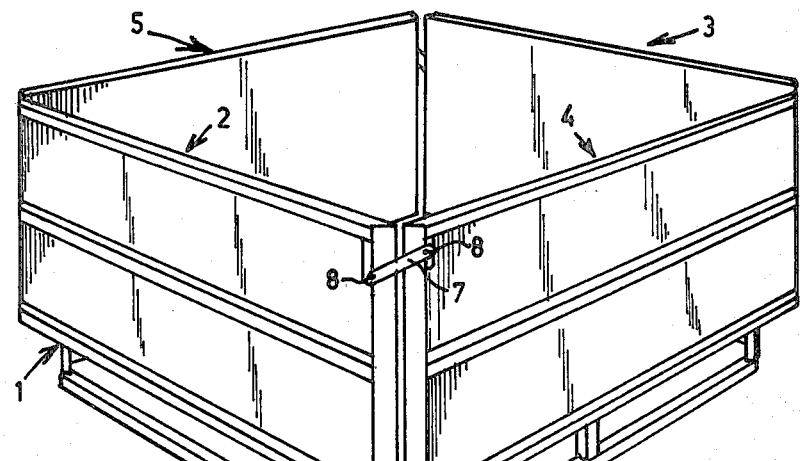
FIG. 1 is a perspective view of the box-like pallet of the invention.
Figure 1A:
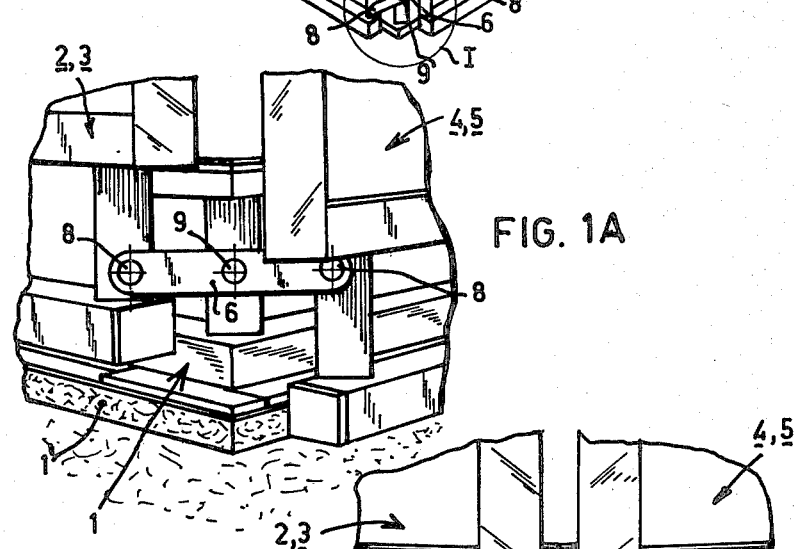
FIG. 1A is a schematic prespective view on a larger scale of section I of FIG. 1 and shows the pallet in the position for filling it on an elevation.
Figure 1B:
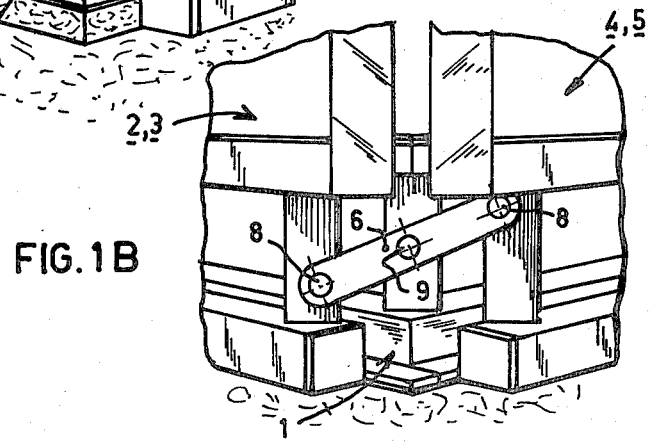
Figures 6, 8, 9:
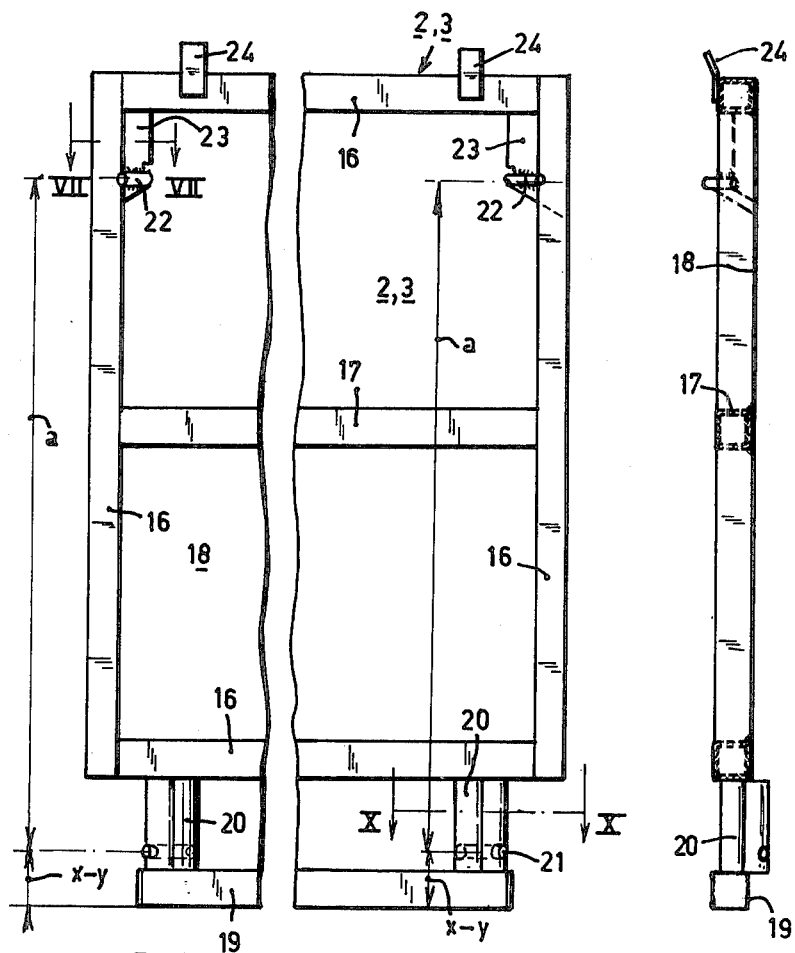
Figure 10:
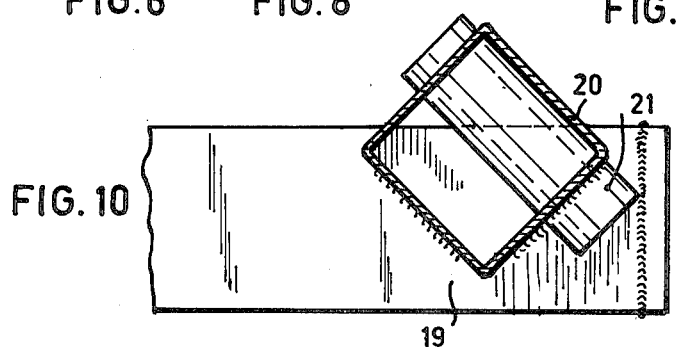
Figures 11, 12:
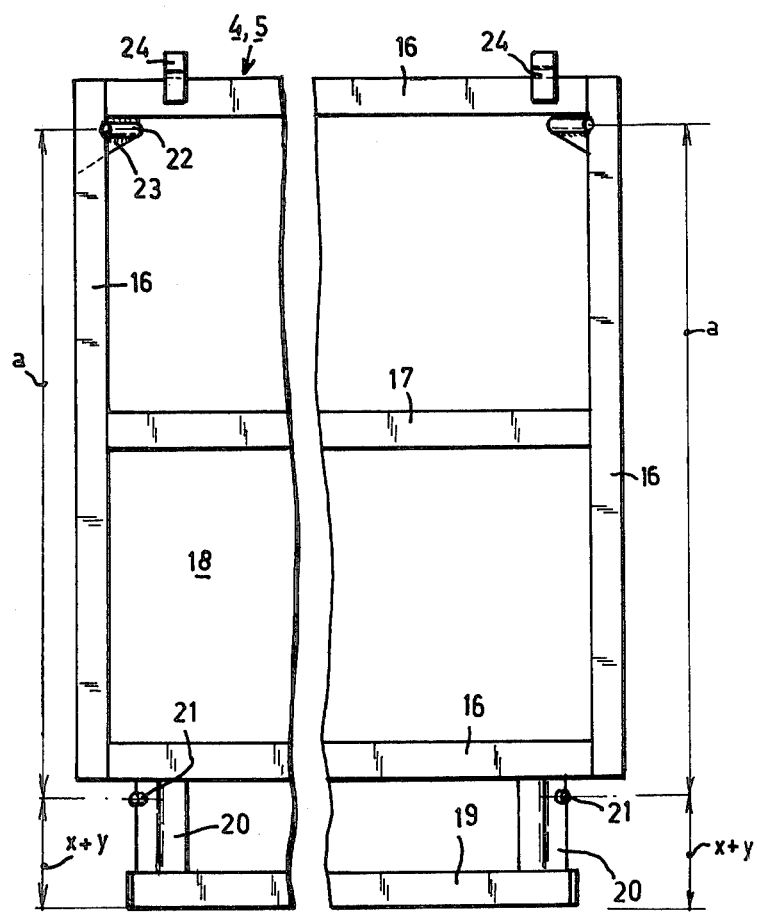

FIG. 1B corresponds with FIG. 1A and shows the pallet in the filled condition;

FIG. 2 is a view of a corner of the bottom of the pallet;

FIG. 3 is a section according to the line III—III in FIG. 2;

FIG. 4 is a top view of a corner of the bottom of the pallet;

FIG. 5 is a side view of FIG. 4;

FIG. 6 is a front view of the left section of a side wall of the pallet;

FIG. 7 is a cross-section according to the line VII—VII in FIG. 6, where also the connection between two adjacent side walls by means of a pivot strip is illustrated;

FIG. 8 is a front view of the right-hand section of the side wall of FIG. 6 of the pallet;

FIG. 9 is a side view of FIG. 8;

FIG. 10 is a cross-section according to line X—X in FIG. 8;

FIG. 11 is a front view of the left-hand section of another side wall of the pallet; and FIG. 12 is a front view of the right-hand section of the side wall of the pallet of FIG. 11.

It appears from FIG. 1 that the box-like pallet of the invention essentially consists of a rectangular bottom 1 and of four side walls 2, 3, 4, 5. The side walls 2, 3, 4, 5 are interconnected at each corner of the pallet by means of two superimposed and spaced pivot strips 6 and 7, which are connected to the side walls by means of pivot journals 8 and whereby the lower pivot strip 6 is also rotatably mounted on a pivot pin 9, which is fixedly secured to the bottom 1 of the pallet. The pivot journals 8 are arranged on the opposed side walls 2 and 3 at a lower level than the pivot journals 8 on the other pair of opposed side walls 4 and 5, so that when the bottom 1 is supported on an elevation 1' (FIG. 1A) at a certain distance above a stand surface, for instance the floor, the pivot strips can be brought in a horizontal position, wherein the side walls 2, 3 and 4, 5 are pairwise at the largest possible distance from each other and one pair of side walls, for instance 4 and 5, rest on the floor with their lower edge. When for instance the pallet is removed from the elevation 1', for instance by means of a fork truck, and is placed on the floor, the bottom 1 is forced downwardly by the weight of for instance the cardboard boxes with cheese, placed in the box-like pallet, until the bottom 1 and the side walls 2, 3 rest on the ground, FIG. 1B. During said procedure the side walls 2, 3 and 4, 5 move pairwise toward each other so that the boxes of cheese are loaded under pressure in two directions, perpendicularly to each other.

By stacking the box-like pallets one above the other the boxes of cheese can also be loaded under pressure in vertical direction, in the following manner. The height of the side walls 2, 3 and 4, 5 above the bottom of the pallet is selected such, that the upper layer of boxes protrudes above the upper edge of the side walls over a small distance, for instance ±3 to 4 mm. By letting the bottom of the upper filled pallet rest on the boxes of cheese in the lower filled pallet, the latter is also loaded under pressure in vertical direction. At the top the upper pallet of a stack of pallets can be covered by a panel, onto which weights or other heavy articles are placed.

A detailed description of a preferred embodiment of the box-like pallet of the invention is given hereinafter.

The rectangular bottom 1, vide particularly FIGS. 4 and 5, consists of two frames 10 and 11 of square tubes, which are spaced from each other by square legs 12 welded in the four corners onto the frames 10 and 11. At its top the frame 10 is covered by a covering plate 13 and at its bottom the frame 11 is covered by a lower plate 14, vide also FIGS. 2 and 3, which are secured to the tubular frames 10 and 11 by means of welding. The tubular frames 10 and 11 may possibly be reinforced by one or more square tubes 10', placed in the plane of the frame, and for instance made of the same material as the frames themselves. The legs 12, also made of square tubes, are placed with two side planes parallelly to and with the two other side planes perpendicularly to the vertical bisector plane of the corner of the bottom 1, which is perpendicular to the bottom 1, so that one longitudinal centre plane of the legs 12 lies in the bisector plane and the other longitudinal centre plane is perpendicular to the bisector plane. In the middle of the leg 12, in the bisector plane, a sleeve 15 is secured within the leg 12, the center line of which encloses an angle of 45 degrees with the side edges of the bottom 1 and the side walls 2, 3, 4 and 5 respectively, of the pallet, and which is at a distance x above the lower surface of the bottom 1. The function of the sleeve 15 will be further elucidated hereinafter.

It appears from FIG. 5 that between the frames 10 and 11 of the bottom 1 a free space is provided. The forks of a fork truck can be inserted into said space to handle the pallet when filling and emptying it. When the fork truck is provided with a tilting device, the pallet can be turned upside down and can thus be emptied.

In FIGS. 6, 7, 8, 9 and 10 a pair of opposed rectangular side walls 2 and 3 of the pallet is illustrated. The side walls 2 and 3 have both the same configuration and are provided with a tubular frame 16 of the same material as the frames 10 and 11 of the bottom 1. In the middle of their height the frames 16 are provided with a horizontal reinforcing tube 17 of the same material, At the interior, so at the side facing the contents of the pallet, the tubular frame 16 is provided with a cover plate 18. As appears from FIG. 7 the vertical side walls of the tubular frame 16 are outwardly beveled at an angle of 45 degrees, and the object thereof is further elucidated hereinafter. The side walls 2, 3 are provided with a foot 19, connected to the frame 16 by means of square legs 20. The foot 19 is in one plane with the frame 16 and is made of the same tubular material as the frame 16, but it is shorter than the frame 16, as appears clearly from FIGS. 6 and 8. The legs 20, made of the same tubular material as the legs 12, are placed parallelly to and in the same position as the legs 12 of the bottom 1, vide FIG. 3. In the two legs 20, under an angle of 45 degrees with the side wall 2, 3 a sleeve 21 is placed (FIG. 10), the function of which will be further elucidated hereinafter. The center line of the sleeves 21 is at a distance $x-y$ from the lower edge of the side walls 2 and 3.

Near the upper edge of the side walls 2 and 3 (FIG. 6 and 7) a sleeve 22 is mounted at both side edges, the center line of said sleeve enclosing an angle of 45 degrees with the side wall and being placed at a distance a above the sleeve 21. The sleeve 22 is welded onto a support plate 23, which is welded parallelly to the sleeve 22 on the frame 16. At the side edges of the walls 2 and 3 the cover plate 18 of the side walls 2 and 3 is folded at an angle of 135 degrees and secured to the vertical posts of the frame 16.

Two or more centering lips 24 are secured at the exterior of the upper beam of the frame 16, the upper protruding section of said lips being folded outwardly at a small angle, and serving to center the side walls 2 and 3 of a superimposed pallet, when the pallets are stacked.

In FIGS. 11 and 12 the two other opposed side walls 4 and 5 of the box-like pallet of the invention are illustrated. In the same manner as the side walls 2 and 3 the side walls 4 and 5 are composed of a frame 16, a reinforcing tube 17, a cover plate 18, a foot 19, legs 20, sleeves 21 and 22, support plates 23 and centering lips 24 and are equal to the side walls 2 and 3, except for the height of the center lines of the sleeves 21 and 22 above the lower edge of the side walls. The center lines of the sleeves 21 are at a distance $x+y$ above the lower edge of the side walls 4 and 5, the distance between the sleeves 21 and 22 being a, as is also the case with the other opposed side walls 2 and 3.

In each corner of the pallet each time a side wall 2 or 3 and a side wall 4 or 5 are movably interconnected by a lower pivot strip 6 (FIGS. 2 and 3) and an upper pivot strip 7 (FIG. 7). The pivot strip 6 at the level of the bottom 1 of the pallet is mounted pivotally at one end on the sleeve 21 of a side wall 2 or 3 by means of a bore, and at the other end on a sleeve 21 of a side wall 4 or 5 by means of a bore. At both ends the pivot strip 6 is enclosed on the sleeve 21 by means of an intermediate ring 25, a bolt 26 and a nut 27, the distance between the intermediate ring 25 and the leg 20 being somewhat greater than the thickness of the strip 6, to obtain some play for the pivotal movement.

In the middle between the bores for the sleeves 21 the pivot strip 6 is provided with a third bore, which is in one line with the other two bores. The pivot strip 6 with said third bore is pivotally mounted on the sleeve 15, which is secured in the leg 12 of the bottom 1 of the pallet, and is enclosed on the sleeve 15 by means of an intermediate ring 28, a bolt 29 and a nut 30. The outwardly protruding section of the sleeve 15 has such a length that the strip 6 is displaceable parallelly to itself and longitudinally of the sleeve 15, the object of which will be further elucidated hereinafter. The center lines of the sleeves are parallel to each other, lie in one plane and stand at an angle of 45 degrees relative to the side walls 2, 3 and 4, 5 and the pivot strip 6 is perpendicular to said center lines.

The pivot strip 7 in each corner near the upper edge of the side walls 2, 3 and 4, 5 (FIGS. 6 and 7) is pivotally mounted at one end on the sleeve 22 at the side wall 2 and 3 by means of a bore, and is pivotally mounted at the other end on a similar sleeve 22 at the side wall 4 or 5 by means of a bore. At both ends the pivot strip 7 is enclosed on the sleeve by means of an intermediate ring 31, a bolt 32 and a nut 33, such that the strip 7 is freely pivotal. The center lines of the two sleeves 22 are parallel to each other, lie in one plane and are at an angle of 45 degrees relative to the side walls 2, 3 and 4, 5 and the pivot strip 7 is perpendicular to said center lines.

The operation of the box-like pallet of the invention is as follows:

The empty pallet is lifted with the aid of a fork truck and placed with its bottom on the sheet-like elevation 1' (vide FIG. 1A), the thickness of which is such that the center lines of the sleeves 15 and 21 and of the sleeves 22 and the strips 6 and 7 arrive in a plane, parallel to the plane of the support 1'. Then the opposed side walls 2 and 3 and the opposed side walls 4 and 5 are at the largest possible distance from each other and the side walls 4, 5 rest next to the sheet like support 1' or elevation on the ground or floor of the room where the pallet is placed. In this filling position of the pallet (FIG. 1A) the distance between the side walls 2 and 3 and between the side walls 4 and 5 corresponds with the length and the width respectively, of a layer of boxes, for instance filled with cheese. The pallet is now filled with cheese, packed in rectangular boxes, or other packages and/or articles, up to a level at which the upper edge of the upper layer of boxes or other articles protrudes over a small distance (3 to 4 mm) above the upper edge of the side walls 2, 3 and 4, 5. Then the filled pallet is lifted by means of the fork truck again and lowered next to the sheet-like support 1' with the bottom of the pallet on the floor, and owing to the weight of the cheese boxes and because the side walls 4, 5 rest on the floor, the pivot pin 9 is forced downwardly and thereby the pivot strips 6 are pivoted downwardly about the center line of the sleeve 21 on the side walls 4, 5, so that the side walls 2 and 3 are pulled downwardly and arrive on the floor together with the side walls 4 and 5. Therewith the pivot strips 7 are also pivoted over the same angle in the same direction, so that the side walls 2, 3 and 4, 5 are moved toward each other pairwise and the cheese boxes or other articles are loaded under pressure in two horizontal directions, which are perpendicular to each other. Upon movement of the side walls 2, 3 and 4, 5 toward each other the pivot strips 6 move parallelly to themselves on the sleeves 15 in the direction of the legs 12.

Because the upper layer of cheese boxes protrudes over a small distance above the upper edge of the side walls, the cheese boxes, when stacking the pallets, are also vertically loaded by pressure by the bottom of the superimposed pallet. Said vertical pressure can never become more than a pre-determined maximum value, because when the side walls are supported with their lower edges on the floor or on the side walls of a lower pallet, the bottom of the pallets can not move downwardly any further. The cheese boxes in the upper pallet of a stack can be loaded by pressure in vertical direction by means of a cover plate, on which weights or other heavy articles are placed.

Although a preferred embodiment of the box-like pallet of the invention is described above the invention also relates to a box-like pallet, provided with a bottom and with two or more interconnected side walls.

In accordance with the invention the two side edges of at least one side wall are connected to the adjacent side walls, in an upwardly and downwardly movable manner relative to the bottom, by means of two strips which are pivotally mounted on the side walls, and at least one other side wall is fixedly connected to the bottom. Said embodiment of the box-like pallet of the invention is not illustrated in the drawing.

Furthermore the invention also relates to a box-like pallet, provided with a rectangular bottom and four upright interconnected side walls.

Thereby in accordance with the invention two side edges of a pair of opposed side walls are connected to the adjacent side walls, in an upwardly and downwardly movable manner relative to the bottom, by means of at least two strips which are pivotally mounted on the side walls and the other pair of opposed side walls is fixedly connected to the bottom. This embodiment of the box-like pallet of the invention is neither illustrated in the drawing.

I claim:

1. A box-like pallet, comprising: a bottom and at least two interconnected, upright side walls, wherein two side edges of at least one side wall are connected to adjacent side walls in an upwardly and downwardly movable manner relative to the bottom, by means of at least two strips which are pivotably attached at the ends to the adjacent side walls, and at least one other side wall is fixedly connected to the bottom.

2. A box-like pallet, comprising: a rectangular bottom and four upright, interconnected side walls, wherein two side edges of a pair of opposed side walls are connected to adjacent side walls, in an upwardly and downwardly movable manner relative to the bottom, by means of at least two strips which are pivotably attached at the ends of the adjacent side walls, and the other pair of opposed side walls is fixedly connected to the bottom.

3. A box-like pallet, comprising: a rectangular bottom and four side walls, both interconnected and connected to the bottom, wherein the two side edges of all the side walls are interconnected in an upwardly and downwardly movable manner relative to the bottom, by means of at least two strips which are pivotably attached at the ends to adjacent side walls and at each corner of the pallet a lower strip between pivots on the side walls is mounted on a pivot pin secured to the bottom, in such a way that when the lower edges of the side walls and the lower surface of the bottom lie in one plane, and in each corner of the pallet the pivot pin is at a distance x from that plane, a pivot center line of the latter strip at the one side wall is at a distance $x+y$ from said plane and that a pivot center line of said strip at the other side wall is at a distance $x-y$ from said plane, and the longitudinal center lines defined by the pivot strips enclose an acute angle with the bottom of the pallet.

4. A box-like pallet in accordance with claim 1, wherein the two strips are an upper strip and a lower strip, and the lower strip is mounted to the bottom by a pivot pin having an axis parallel to a lower surface of the bottom and bisecting the connection of the adjacent side walls, and center lines of the pertaining pivots of said lower strip are pivotably attached to the side walls , are parallel to, lie in one plane with and are equally spaced from the axis of the pivot pin, and, wherein the lower pivot strip is perpendicular to said center lines, and the upper pivot strip has the same length as and is parallel to the lower pivot strip.

5. A box-like pallet in accordance with claims 3 or 4, wherein the pivot pin and the pivots of the strips on the side walls are provided with cylindrical sleeves, secured in bores in legs of the bottom and of the side walls.

6. A box-like pallet in accordance with claim 5, wherein the lower pivot strip is mounted slidably parallel to itself on its sleeve and the strips on the sleeves on the side walls are enclosed by means of spacer rings and bolts and nuts.

* * * * *